(12) United States Patent
Tranninger et al.

(10) Patent No.: US 9,932,468 B2
(45) Date of Patent: Apr. 3, 2018

(54) C2C3 RANDOM COPOLYMER COMPOSITION WITH IMPROVED BALANCE BETWEEN SEALING INITIATION TEMPERATURE AND MELTING POINT

(71) Applicant: BOREALIS AG, Vienna (AT)

(72) Inventors: Cornelia Tranninger, Pucking (AT); Luigi Resconi, Neuhofen an der Krems (AT); Karlheinz Friedrich, Weiden am See (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 15/551,342

(22) PCT Filed: Feb. 29, 2016

(86) PCT No.: PCT/EP2016/054190
§ 371 (c)(1),
(2) Date: Aug. 16, 2017

(87) PCT Pub. No.: WO2016/139162
PCT Pub. Date: Sep. 9, 2016

(65) Prior Publication Data
US 2018/0030255 A1 Feb. 1, 2018

(30) Foreign Application Priority Data

Mar. 2, 2015 (EP) .................................... 15157086

(51) Int. Cl.
*C08L 23/14* (2006.01)
*C08J 5/18* (2006.01)
(Continued)

(52) U.S. Cl.
CPC .............. *C08L 23/14* (2013.01); *C08J 5/18* (2013.01); *B29C 55/28* (2013.01);
(Continued)

(58) Field of Classification Search
CPC ............... C08L 23/14; C08L 2205/025; C08L 2205/03; C08J 5/18; C08J 2323/14; C08J 2423/14; B29C 55/28
See application file for complete search history.

(56) References Cited

U.S. PATENT DOCUMENTS

2014/0155547 A1* 6/2014 Gahleitner ............ C08F 210/06
525/53

FOREIGN PATENT DOCUMENTS

EP 056326 A1 9/1993
EP 0887379 A1 12/1998
(Continued)

OTHER PUBLICATIONS

Edward P. Moore, Jr., Editor, "Polypropylene Handbook, Polymerization, Characterization, Properties, Processing, Applications", Hanser Publishers, 1996, 4 pages.
(Continued)

*Primary Examiner* — Roberto Rabago
(74) *Attorney, Agent, or Firm* — Lowenstein Sandler LLP

(57) ABSTRACT

$C_2C_3$ random copolymer composition with an improved balance between sealing initiation temperature (SIT) and melting point (Tm), i.e. low SIT and high melting point. In addition the inventive composition shows a broad sealing window, low hexane solubles and good optical properties, like low haze.

17 Claims, 2 Drawing Sheets

(51) Int. Cl.
*B29K 23/00* (2006.01)
*B29C 55/28* (2006.01)
*B29K 105/00* (2006.01)

(52) U.S. Cl.
CPC ...... *B29K 2023/08* (2013.01); *B29K 2023/14* (2013.01); *B29K 2105/0085* (2013.01); *C08J 2323/14* (2013.01); *C08J 2423/14* (2013.01); *C08L 2205/025* (2013.01); *C08L 2205/03* (2013.01)

(56) References Cited

FOREIGN PATENT DOCUMENTS

| WO | 92/12182 A1 | 7/1992 |
| WO | 2006100269 A1 | 9/2006 |
| WO | 2010052260 A1 | 5/2010 |
| WO | 2010052263 A1 | 5/2010 |
| WO | 2010052264 A1 | 5/2010 |
| WO | 2013007650 A1 | 1/2013 |
| WO | 2015004193 A1 | 1/2015 |

OTHER PUBLICATIONS

PCT, Notification of Transmittal of the International Search Report and the Written Opinion for PCT/EP2016/054190, dated Apr. 7, 2016, 9 pages.
FDA, CFR—Code of Federal Regulations Title 21, Chapter 1, part 177, section 1520, s. Annex B, Apr. 1, 2016, 7 pages.
Soares, J.B.P., Fractionation, In: Encyclopedia of Polymer Science and Technology, John Wiley & Sons, New York, pp. 75-131, vol. 10, 2001.

\* cited by examiner

Figure 1: sealing range
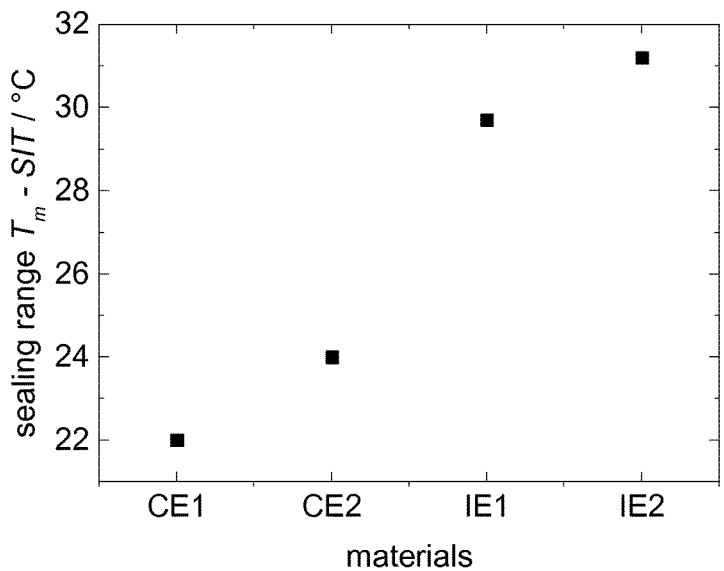
Figure 2: DMTA measurements
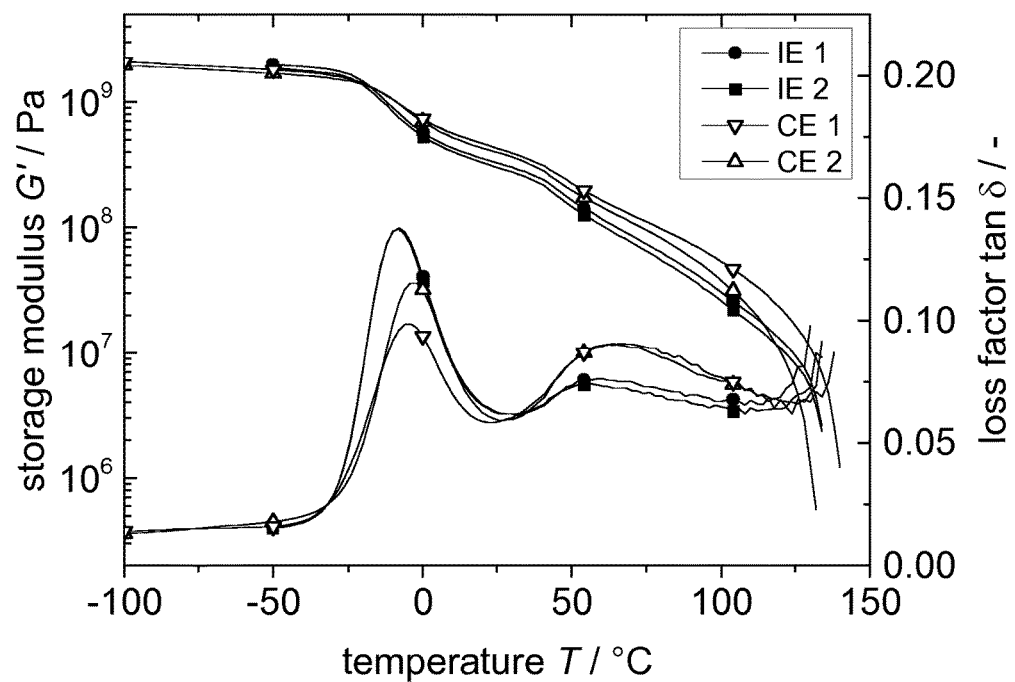

Figure 3: aTREF measurements
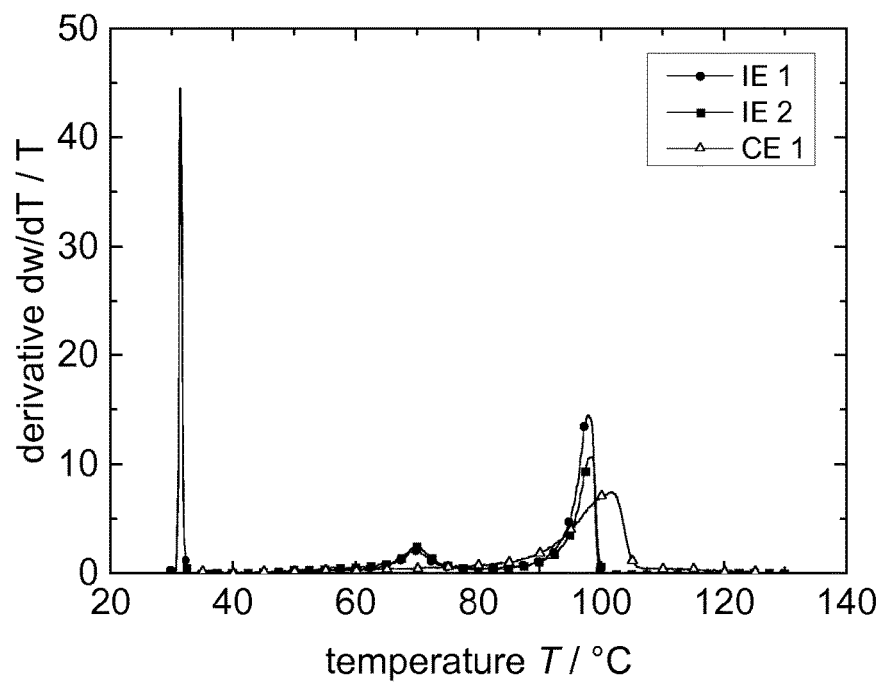

C2C3 RANDOM COPOLYMER COMPOSITION WITH IMPROVED BALANCE BETWEEN SEALING INITIATION TEMPERATURE AND MELTING POINT

CROSS REFERENCE TO RELATED APPLICATION(S)

This application is a national phase of International Application No. PCT/EP2016/054190, filed on Feb. 29, 2016, which claims the benefit of European Patent Application No. 15157086.8, filed on Mar. 2, 2015. The contents of these applications are hereby incorporated by reference in their entirety.

The present invention is related to a new $C_2C_3$ random copolymer composition which shows an improved balance between sealing initiation temperature (SIT) and melting point (Tm), i.e. low SIT and high melting point. In addition the inventive composition shows a broad sealing window, low hexane solubles and good optical properties, like low haze.

The present invention is furthermore related to the manufacture of such composition and to its use.

Polypropylenes are suitable for many applications.

For instance polypropylene (PP) is applicable in areas where sealing properties play an important role, like in the food or medical packing industry.

Heat sealing is the predominant method of manufacturing flexible and semi-rigid packages. Important characteristics of good sealing performance are inter alia a) low seal initiation temperature, which is needed to support high speed on packaging machines, b) broad sealing window, which is especially needed for processing window on HFFS (Horizontal Form, Fill and Seal) packaging lines and c) additionally high melting point, which is important, in particular for biaxially oriented PP, to avoid stickiness and blocking and accomplish high BOPP line speeds.

To ensure fast sealing, a low SIT is of advantage. By operating at lower temperature there is the benefit that the article to be sealed is not exposed to high temperatures. There are also economic advantages, since lower temperatures are of course cheaper to generate and maintain.

There are further advantages by avoiding high sealing temperatures, especially when temperature sensitive goods are to be packed.

Furthermore, it is also desired to have a packaging material with satisfying optical properties, such as low haze or high clarity.

In the field of some food applications such as retort pouches or some medical applications, a sterilization treatment is needed.

The most common sterilization procedures are the use of heat (steam), radiation (beta radiation, electrons, or gamma radiation) or chemicals (usually ethylene oxide). Steam sterilization is usually carried out in a temperature range of about 120 to 130° C. Thus, the material should have a sufficient thermal stability, like a melting temperature significantly higher than the usual steam sterilization temperature of about 120 to 130° C.

Of course, treatment of a polymer under the sterilization conditions outlined above can impair its final properties, especially the optical properties such as transparency.

Irrespectively from the polymer type, a polymer must fulfil at best all desired end properties and additionally must be easily processable, i.e. must withstand stress. However, end properties and processing properties act often in a conflicting manner.

It frequently turns out that improvement of one of the desired properties is achieved on the expense of the other properties.

Therefore there is still a need to design materials having an improved balance between high melting point and low sealing initiation temperature SIT, which additionally possess a broad sealing window, beneficial optical properties, low amounts of hexane solubles and sufficient thermal stability to enable sterilization treatment without negatively affecting the optical properties.

The present invention is based on the finding that the above discussed needs for heat sealing applications, i.e. simultaneously having improved balance between high melting point and low sealing initiation temperature SIT, broad sealing window, beneficial optical properties, low amounts of hexane solubles and sufficient thermal stability to enable sterilization treatment without negatively affecting the optical properties, can be achieved by a specific design of a polyolefin composition.

BRIEF DESCRIPTION OF THE DRAWINGS

FIG. 1 illustrates the sealing range of the C2C3 random copolymer composition of the invention as compared to comparative examples;

FIG. 2 illustrates the storage modulus and loss factor of the C2C3 random copolymer composition of the invention as compared to comparative examples as measured in accordance with ISO 6721-7;

FIG. 3 illustrates the derivative dw/dT/T of the C2C3 random copolymer composition of the invention as compared to comparative examples as measured in accordance with ISO 6721-7.

Thus, according to a first aspect the present invention is directed to a $C_2C_3$ random copolymer composition comprising the following 3 polymer fractions (A), (B) and (C) with different comonomer content, (A) 30 to 65 wt % of a $C_2C_3$ random copolymer (A) with a $C_2$ content ($C_2$A) of 0.4 to 1.5 wt % based on copolymer (A) as measured with Fourier-transform infrared (FTIR) spectroscopy (B) 25 to 50 wt % of a $C_2C_3$ random copolymer (B) with a $C_2$ content ($C_2$B) of 3.0 to 10.0 wt % based on copolymer (B) calculated as described in the experimental part and (C) 5 to 35 wt % of a $C_2C_3$ random copolymer (C) with a $C_2$ content ($C_2$C) of 7.0 to 15.0 wt % based on copolymer (C) calculated as described in the experimental part, whereby the sum of the amount of the 3 polymer fractions (A), (B) and (C) is 100% and whereby the comonomer content of the polymer fractions increases from fraction (A) to fraction (C) according to ($C_2$A)<($C_2$B) <($C_2$C), and whereby the composition is characterized by (i) a total $C_2$ content in the range of 3.0 wt % up to 7.0 wt %, as measured with Fourier-transform infrared (FTIR) spectroscopy (ii) a melt flow rate MFR2 (230° C.) measured according to ISO 1133 in the range of 2.0 to 15.0 g/10 min, (iii) a melting temperature Tm as determined by DSC according to ISO 11357 of from 128° C. to 145° C., (iv) a crystallization temperature $T_c$ as determined as determined by DSC according to ISO 11357 of from 85° C. to 110° C. and (v) a hexane solubles content determined in accordance with FDA section 177.1520 of at most 2.0 wt %

In a second aspect the present invention is related to a $C_2C_3$ random copolymer composition comprising the following 3 polymer fractions (A), (B) and (C), whereby the composition is obtainable, preferably obtained, in the presence of a metallocene catalyst.

In a third aspect the present invention is related to a process for producing a $C_2C_3$ random copolymer composition comprising the following 3 polymer fractions (A), (B) and (C) by sequential polymerization process comprising at least two reactors connected in series, wherein the process comprises the steps of a) polymerizing in a first reactor (R-1) being a slurry reactor (SR), preferably a loop reactor (LR), propylene and ethylene, obtaining a $C_2C_3$ random copolymer (A) as defined above, b) transferring said $C_2C_3$ random copolymer (A) and unreacted comonomers of the first reactor in a second reactor (R-2) being a first gas phase reactor (GPR-1), c) feeding to said second reactor (R-2) propylene and ethylene, d) polymerizing in said second reactor (R-2) and in the presence of said first $C_2C_3$ random copolymer (A) propylene and ethylene obtaining a $C_2C_3$ random copolymer (B), e) transferring said mixture of $C_2C_3$ random copolymer (A) and $C_2C_3$ random copolymer (B), and unreacted comonomers of the second reactor in a third reactor (R-3) being a second gas phase reactor (GPR-2), c) feeding to said third reactor (R-3) propylene and ethylene, d) polymerizing in said third reactor (R-3) and in the presence of the mixture of $C_2C_3$ random copolymer (A) and $C_2C_3$ random copolymer (B) propylene and ethylene obtaining a $C_2C_3$ random copolymer (C), said $C_2C_3$ random copolymer (A), $C_2C_3$ random copolymer (B) and said $C_2C_3$ random copolymer (C) form the $C_2C_3$ random copolymer composition as defined above, whereby the polymerization takes place in the presence of single site solid particulate catalyst, which is preferably free from an external carrier, preferably a catalyst comprising (i) a complex of formula (I):

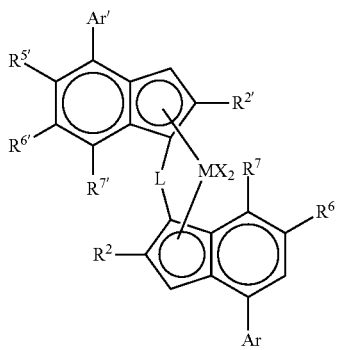

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;
$R^2$ and $R^{2'}$ are each independently a $C_1$-$C_{20}$ hydrocarbyl radical optionally containing one or more heteroatoms from groups 14-16;

$R^{5'}$ is a $C_{1-20}$ hydrocarbyl group containing one or more heteroatoms from groups 14-16 optionally substituted by one or more halo atoms;
$R^6$ and $R^{6'}$ are each independently hydrogen or a $C_{1-20}$ hydrocarbyl group optionally containing one or more heteroatoms from groups 14-16, whereby $R^{6'}$ is preferably a tertiary alkyl group;
$R^7$ is hydrogen or $C_{1-20}$ hydrocarbyl group optionally containing one or more heteroatoms from groups 14-16;
$R^{7'}$ is hydrogen;
Ar is independently an aryl or heteroaryl group having up to 20 carbon atoms optionally substituted by one or more groups $R^1$;
Ar' is independently an aryl or heteroaryl group having up to 20 carbon atoms optionally substituted by one or more groups $R^1$;
each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$;
each $R^4$ is a $C_{1-20}$ hydrocarbyl group;
and (ii) a cocatalyst comprising a compound of a group 13 metal, e.g. Al or boron compound.

In a fourth aspect the invention is related to the use of the above defined $C_2C_3$ random copolymer composition for preparing articles.

In a fifth aspect the invention is related to films comprising the above defined $C_2C_3$ random copolymer composition, whereby the films are characterized by
(i) a seal initiation temperature (SIT) (determined as described in the experimental part) of below 110° C.
(ii) satisfying the equation $T_m$–SIT≥25
(iii) a haze (determined according to ASTM D1003-00 on cast films with a thickness of 50 μm) of at most 2.5%
(iv) a transparency (determined according to ASTM D1003-00 on cast films with a thickness of 50 μm) of at least 90.0%
(v) a relative tear resistance in machine direction [N/mm] according to Elmendorf method (ISO 6383-2) for a cast film thickness of 50 μm of at least 28.0 N/mm and
(vi) a relative tear resistance in transverse direction [N/mm] according to Elmendorf method (ISO 6383-2) for a cast film thickness of 50 μm of at least 200.0 N/mm In the following the invention ($1^{st}$, $2^{nd}$ $3^{rd}$ and $4^{th}$ aspect) is defined in more detail.

The composition of the present invention is a $C_2C_3$ random copolymer composition, which comprises, preferably consists of, 3 different polymer fractions (A), (B) and (C).

The 3 fractions differ in $C_2$-content, thus the composition is trimodal in view of comonomer content.

From the wording of the three polymers it comes apparent that they are different polymers. $C_2C_3$ random copolymer (A) has the lowest $C_2$-content ($C_2A$), $C_2C_3$ random copolymer (C) has the highest $C_2$-content ($C_2C$) and $C_2C_3$ random copolymer (B) has a $C_2$-content ($C_2B$) in-between, thus the $C_2$ content increases according to ($C_2A$)<($C_2B$)<($C_2C$).

Especially good results are achieved in case the individual components (A), (B), and (C) are present in specific amounts.

Thus it is preferred that the $C_2C_3$ random copolymer composition is composed of:
30 to 65 wt % of (A), 25 to 50 wt % of (B) and 5 to 35 wt % of (C), based on the $C_2C_3$ random copolymer composition, preferably based on the total amount of $C_2C_3$ random copolymer (A), $C_2C_3$ random copolymer (B), and the $C_2C_3$ random copolymer (C).

Preferably fraction (A) is present in an amount of 35 to 55 wt %, fraction (B) is preferably present in an amount of 30 to 40 wt % and fraction (C) is preferably present in an amount of 10 to 30 wt %.

The amount of the three different fractions is preferably decreasing according to (wt % of A)>(wt % of B)>(wt % of C).

The $C_2C_3$ random copolymer composition according to this invention can be obtained by (melt)-mixing the individual fractions, i.e. $C_2C_3$ random copolymer (A), $C_2C_3$ random copolymer (B) and $C_2C_3$ random copolymer (C). During the mixing suitable additives can additionally be added. For mixing, a conventional compounding or blending apparatus, e.g. a Banbury mixer, a 2-roll rubber mill, Buss-co-kneader or a twin screw extruder may be used. The polymer composite recovered from the extruder is usually in the form of pellets.

Preferably the $C_2C_3$ random copolymer composition according to this invention is obtained by a sequential polymerization process comprising at least three reactors connected in series, as described below (in-situ blend or reactor blend).

$C_2C_3$ random copolymer (A), i.e. fraction (A), has an ethylene content ($C_2A$) in the range of 0.4 to 1.5 wt %, based on fraction (A). The ethylene content ($C_2A$) is preferably in the range of 0.5 to 1.0 wt %, based on fraction (A).

$C_2C_3$ random copolymer (B), i.e. fraction (B, has an ethylene content ($C_2B$) in the range of 3.0 to 10.0 wt %, based on fraction (B). The ethylene content ($C_2B$) is preferably in the range of 5.0 to 8.0 wt %, based on fraction (B).

$C_2C_3$ random copolymer (C), i.e. fraction (C), has an ethylene content ($C_2C$) in the range of 7.0 to 15.0 wt %, based on fraction (C). The ethylene content ($C_2C$) is preferably in the range of 8.0 to 12.0 wt %, based on fraction (C).

It always has to be taken into consideration that the $C_2$-content of the 3 fractions is different for all 3 fractions and increases according to ($C_2A$)<($C_2B$)<($C_2C$).

Keeping the information provided for the fractions (A), (B) and (C) in mind, it is preferred that the $C_2C_3$ random copolymer composition according to this invention shall have a total $C_2$ content of at least 3.0 wt %, more preferably of at least 3.5 wt %, still more preferably of at least 4.0 wt %.

The total $C_2$ content of the $C_2C_3$ random copolymer composition can be up to 10.0 wt %, preferably up to 8.0 wt % and more preferably up to 6.0 wt %.

However the $C_2C_3$ random copolymer composition according to this invention is preferably monophasic. Accordingly it is preferred that the $C_2C_3$ random copolymer composition does not contain elastomeric (co)polymers, like an ethylene propylene rubber, forming inclusions as a second phase for improving mechanical properties.

A polymer containing elastomeric (co)polymers as insertions of a second phase would by contrast be called heterophasic and is preferably not part of the present invention. The presence of second phases or the so called inclusions are for instance visible by high resolution microscopy, like electron microscopy or atomic force microscopy, or by dynamic mechanical thermal analysis (DMTA).

For this reason DMTA measurements (according to ISO 6721-7) show only one peak visible in the temperature range of 25 to −50° C. for the $C_2C_3$ random copolymer composition according to this invention, which indicates a single phase material.

The $C_2C_3$ random copolymer composition according to this invention furthermore shows three peaks in an analytical TREF (temperature rising elution fractionation)-measurement as described in the experimental part:
one in the temperature range of 0-40° C.,
the second one between 60 and 80° C., and
one peak between 80 and 100° C.

TREF (temperature rising elution fractionation) is a common method to fractionate polyolefins according to their solubility differences.

If the polymer is produced in a multistage process, e.g. in the process described below by using different ethylene contents in each reactor, the different polymer fractions produced in the different reactors will each have their own comonomer distribution which may considerably differ from one another. The TREF curve of the resulting final polymer is then obtained as a superposition of the TREF curves of the different polymer fractions.

The overall melt flow rate, i.e. the melt flow rate MFR2 (230° C.) measured according to ISO 1133 of $C_2C_3$ random copolymer composition can be in a relatively broad range.

Accordingly in one embodiment the $C_2C_3$ random copolymer composition has a melt flow rate MFR2 (230° C.) of at least 2.0 g/10 min up to 15.0 g/10 min preferably of at least 4.0 g/10 min, up to 12 g/10 min and more preferably of at least 5.0 g/10 min up to 10 g/10 min.

The inventive $C_2C_3$ random copolymer composition is featured by a rather high melting temperature.

Accordingly it is appreciated that the inventive $C_2C_3$ random copolymer composition has a melting temperature in the range of more than 128 to 145° C., preferably in the range of 130 to 142° C., and more preferably in the range of 132 to 140° C.

Additionally it is appreciated that the inventive $C_2C_3$ random copolymer composition has crystallization temperature in the range of 85 to 110° C., preferably in the range of 90 to 105° C. and more preferably in the range of 95 to 100° C.

Furthermore the inventive $C_2C_3$ random copolymer is characterized by a low amount of hexane solubles. Thus the inventive $C_2C_3$ random copolymer has hexane solubles content determined in accordance with FDA section 177.1520 of at most 2.0 wt %, preferably of at most 1.9 wt % and more preferably of at most 1.7 wt %.

The xylene cold soluble fraction (XCS) of the instant $C_2C_3$ random copolymer is preferably not more than 35.0 wt %, more preferably not more than 30.0 wt % and still more preferably not more than 25.0 wt %. Accordingly it is preferred that the $C_2C_3$ random copolymer has a xylene cold soluble fraction (XCS) in the range of 10.0 to 35.0 wt %, more preferably in the range of 15.0 to 30.0 wt % and more preferably in the range 18.0 to 25.0 wt %.

The $C_2C_3$ random copolymer composition comprising the 3 polymer fractions (A), (B) and (C) as described above is obtainable, preferably obtained, in the presence of a metallocene catalyst.

The metallocene catalyst can be a supported catalyst, using conventional supports or can be free from an external carrier. Preferably used are metallocene catalysts which are free from an external carrier.

Accordingly the $C_2C_3$ random copolymer composition is in particular obtainable, preferably obtained, by a sequential polymerization process comprising at least three reactors connected in series, wherein said process comprises the steps of a) polymerizing in a first reactor (R-1) being a slurry reactor (SR), preferably a loop reactor (LR), propylene and ethylene, obtaining a $C_2C_3$ random copolymer (A) as defined above, b) transferring said $C_2C_3$ random copolymer (A) and unreacted comonomers of the first reactor in a second reactor (R-2) being a first gas phase reactor (GPR-1), c) feeding to said second reactor (R-2) propylene and ethylene, d) polymerizing in said second reactor (R-2) and in the presence of said first $C_2C_3$ random copolymer (A) propylene and ethylene obtaining a $C_2C_3$ random copolymer (B), e) transferring said mixture of $C_2C_3$ random copolymer (A) and $C_2C_3$ random copolymer (B), and unreacted comonomers of the second reactor in a third reactor (R-3) being a second gas phase reactor (GPR-2), c) feeding to said third reactor (R-3) propylene and ethylene, d) polymerizing in said third reactor (R-3) and in the presence of the mixture of $C_2C_3$ random copolymer (A) and $C_2C_3$ random copolymer (B) propylene and ethylene obtaining a $C_2C_3$ random copolymer (C), said $C_2C_3$ random copolymer (A), $C_2C_3$ random copolymer (B) and said $C_2C_3$ random copolymer (C) form the $C_2C_3$ random copolymer composition as defined above, whereby the polymerization takes place in the presence of single site solid particulate catalyst, preferably a catalyst comprising (i) a complex of formula (I):

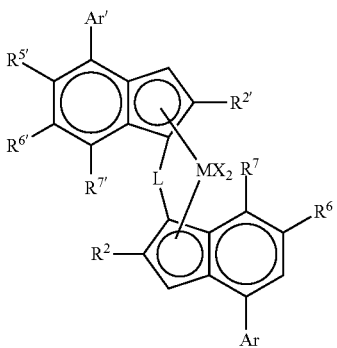

wherein
M is zirconium or hafnium;
each X is a sigma ligand;
L is a divalent bridge selected from $-R'_2C-$, $-R'_2C-CR'_2-$, $-R'_2Si-$, $-R'_2Si-SiR'_2-$, $-R'_2Ge-$, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;
$R^2$ and $R^{2'}$ are each independently a $C_1$-$C_{20}$ hydrocarbyl radical optionally containing one or more heteroatoms from groups 14-16;
$R^{5'}$ is a $C_{1-20}$ hydrocarbyl group containing one or more heteroatoms from groups 14-16 optionally substituted by one or more halo atoms;
$R^6$ and $R^{6'}$ are each independently hydrogen or a $C_{1-20}$ hydrocarbyl group optionally containing one or more heteroatoms from groups 14-16, whereby $R^{6'}$ is preferably a tertiary alkyl group;
$R^7$ is hydrogen or $C_{1-20}$ hydrocarbyl group optionally containing one or more heteroatoms from groups 14-16;
$R^{7'}$ is hydrogen;
Ar is independently an aryl or heteroaryl group having up to 20 carbon atoms optionally substituted by one or more groups $R^1$;
Ar' is independently an aryl or heteroaryl group having up to 20 carbon atoms optionally substituted by one or more groups $R^1$;
each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$;
each $R^4$ is a $C_{1-20}$ hydrocarbyl group;
and (ii) a cocatalyst comprising a compound of a group 13 metal, e.g. Al or boron compound.

The term "sequential polymerization process" indicates that the $C_2C_3$ random copolymer composition is produced in at least three reactors connected in series. Accordingly, a decisive aspect of the present process is the preparation of the $C_2C_3$ random copolymer composition in three separate reactors. Thus the present process comprises at least a first reactor (R-1), a second reactor (R-2) and a third reactor (R-3). In one specific embodiment the instant process consists of the three polymerization reactors (R-1), (R-2) and (R-3). The term "polymerization reactor" shall indicate that the main polymerization takes place. Thus in case the process consists of three polymerization reactors, this definition does not exclude the option that the overall process comprises for instance a pre-polymerization step in a pre-polymerization reactor. The term "consists of" is only a closing formulation in view of the main polymerization reactors.

The first reactor (R-1) is a slurry reactor (SR) and can be can be any continuous or simple stirred batch tank reactor or loop reactor operating in bulk or slurry. Bulk means a polymerization in a reaction medium that comprises of at least 60% (wt/wt), preferably 100% monomer. According to the present invention the slurry reactor (SR) is preferably a (bulk) loop reactor (LR).

The second reactor (R-2) and the third reactor (R-3) are gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

The condition (temperature, pressure, reaction time, monomer feed) in each reactor is dependent on the desired product which is in the knowledge of a person skilled in the art.

A preferred multistage process is a "loop-gas phase"-process, such as developed by *Borealis* (known as BORSTAR® technology) described e.g. in patent literature, such as in EP 0 887 379 or in WO 92/12182.

Preferably, in the instant process for producing the $C_2C_3$ random copolymer composition as defined above the conditions for the first reactor (R-1), i.e. the slurry reactor (SR), like a loop reactor (LR), of step (a) may be as follows:
the temperature is within the range of 40° C. to 110° C., preferably between 60° C. and 100° C., more preferably between 65 and 95° C.,
the pressure is within the range of 20 bar to 80 bar, preferably between 40 bar to 70 bar,
hydrogen can be added for controlling the molar mass in a manner known per se.

Subsequently, the reaction mixture of the first reactor (R-1) is transferred to the second reactor (R-2), i.e. gas phase reactor (GPR-1), where the conditions are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third reactor (R-3), i.e. gas phase reactor (GPR-2), is similar to the second reactor.

The residence time can vary in the three reactors.

In one embodiment of the process for producing the $C_2C_3$ random copolymer composition the residence time in bulk reactor, e.g. loop is in the range 0.1 to 2.5 hours, e.g. 0.15 to 1.5 hours and the residence time in gas phase reactors will generally be 0.2 to 6.0 hours, like 0.3 to 4.0 hours.

If desired, the polymerization may be effected in a known manner under supercritical conditions in the first reactor, i.e. in the slurry reactor, like in the loop reactor, and/or as a condensed mode in the gas phase reactors.

In the following the catalyst component is defined in more detail. Preferably the catalyst comprises (i) a complex of formula (I):

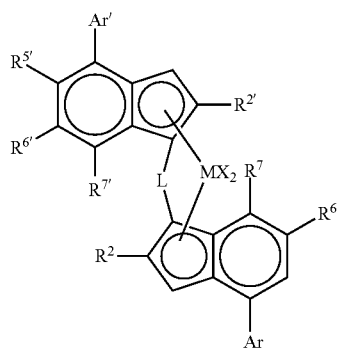

wherein

M is zirconium or hafnium;

each X is a sigma ligand;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;

$R^2$ and $R^{2'}$ are each independently a $C_1$-$C_{20}$ hydrocarbyl radical optionally containing one or more heteroatoms from groups 14-16;

$R^{5'}$ is a $C_{1-20}$ hydrocarbyl group containing one or more heteroatoms from groups 14-16 optionally substituted by one or more halo atoms, $R^6$ and $R^{6'}$ are each independently hydrogen or a $C_{1-20}$ hydrocarbyl group optionally containing one or more heteroatoms from groups 14-16;

whereby $R^{6'}$ is preferably a tertiary alkyl group;

$R^7$ is hydrogen or $C_{1-20}$ hydrocarbyl group optionally containing one or more heteroatoms from groups 14-16;

$R^{7'}$ is hydrogen;

Ar is independently an aryl or heteroaryl group having up to 20 carbon atoms optionally substituted by one or more groups $R^1$;

Ar' is independently an aryl or heteroaryl group having up to 20 carbon atoms optionally substituted by one or more groups $R^1$;

each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$;

each $R^4$ is a $C_{1-20}$ hydrocarbyl group;

and (ii) a cocatalyst comprising a compound of a group 13 metal, e.g. Al or boron compound.

The catalyst used in the process of the invention is in solid particulate form. As mentioned above it can be supported on a conventional carrier know to an art skilled person. Preferably the used catalyst is free from an external carrier.

Ideally, the catalyst is obtainable by a process in which (a) a liquid/liquid emulsion system is formed, said liquid/liquid emulsion system comprising a solution of the catalyst components (i) and (ii) dispersed in a solvent so as to form dispersed droplets; and (b) solid particles are formed by solidifying said dispersed droplets.

Viewed from another aspect therefore, the invention provides a process for the preparation of a $C_2C_3$ random copolymer composition as hereinbefore defined in which the catalyst is prepared by obtaining (i) a complex of formula (I) and a cocatalyst (ii) forming a liquid/liquid emulsion system, which comprises a solution of catalyst components (i) and (ii) dispersed in a solvent, and solidifying said dispersed droplets to form solid particles.

The term $C_{1-20}$ hydrocarbyl group includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups or of course mixtures of these groups such as cycloalkyl substituted by alkyl.

Unless otherwise stated, preferred $C_{1-20}$ hydrocarbyl groups are $C_{1-20}$ alkyl, $C_{4-20}$ cycloalkyl, $C_{5-20}$ cycloalkylalkyl groups, $C_{7-20}$ alkylaryl groups, $C_{7-20}$ arylalkyl groups or $C_{6-20}$ aryl groups, especially $C_{1-10}$ alkyl groups, $C_{6-10}$ aryl groups, or $C_{7-12}$ arylalkyl groups, e.g. $C_{1-8}$ alkyl groups. Most especially preferred hydrocarbyl groups are methyl, ethyl, propyl, isopropyl, tertbutyl, isobutyl, $C_{5-6}$-cycloalkyl, cyclohexylmethyl, phenyl or benzyl.

The term halo includes fluoro, chloro, bromo and iodo groups, especially chloro groups, when relating to the complex definition.

The oxidation state of the metal ion is governed primarily by the nature of the metal ion in question and the stability of the individual oxidation states of each metal ion.

It will be appreciated that in the complexes of the invention, the metal ion M is coordinated by ligands X so as to satisfy the valency of the metal ion and to fill its available coordination sites. The nature of these σ-ligands can vary greatly.

Such catalysts are described in WO2013/007650 which is incorporated herein by reference. Thus, preferred complexes of use in the invention are of formula (II') or (II)

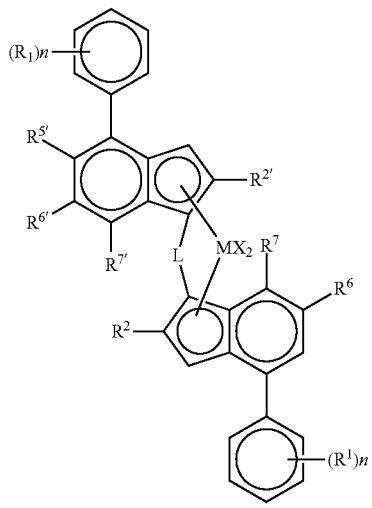

(II')

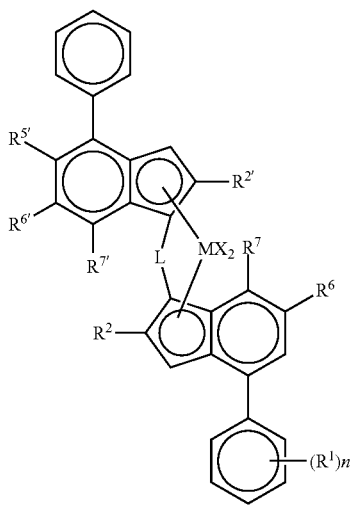

(II)

wherein
M is zirconium or hafnium;
each X is a sigma ligand, preferably each X is independently a hydrogen atom, a halogen atom, $C_{1-6}$ alkoxy group, $C_{1-6}$ alkyl, phenyl or benzyl group;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_{1-20}$ alkyl, $C_{3-10}$ cycloalkyl, tri($C_{1-20}$-alkyl)silyl, $C_{6-20}$-aryl, $C_{7-20}$ arylalkyl or $C7_{-20}$ alkylaryl;
each $R^2$ or $R^{2'}$ is a $C_{1-10}$ alkyl group;
$R^{5'}$ is a $C_{1-10}$ alkyl group or $Z'R^{3'}$ group;
$R^6$ is hydrogen or a $C_{1-10}$ alkyl group;
$R^{6'}$ is a $C_{1-10}$ alkyl group or $C_{6-10}$ aryl group; preferably a tertiary alkyl group;
$R^7$ is hydrogen, a $C_{1-6}$ alkyl group or $ZR^3$ group;
$R^{7'}$ is hydrogen;
Z and Z' are independently O or S;
$R^{3'}$ is a $C_{1-10}$ alkyl group, or a $C_{6-10}$ aryl group optionally substituted by one or more halo groups;
$R^3$ is a $C_{1-10}$-alkyl group;
each n is independently 0 to 4, e.g. 0, 1 or 2;
and each $R^1$ is independently a $C_{1-20}$ hydrocarbyl group, e.g. $C_{1-10}$ alkyl group.

Further preferred complexes of use in the invention are of formula (III') or (III):

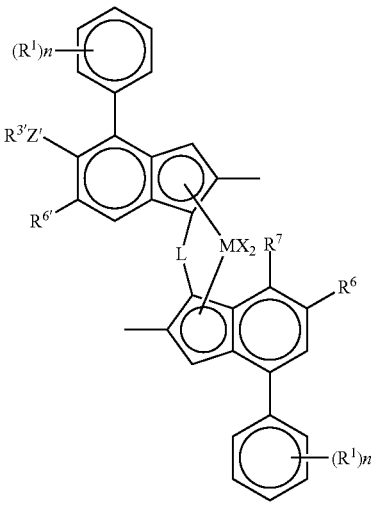

(III')

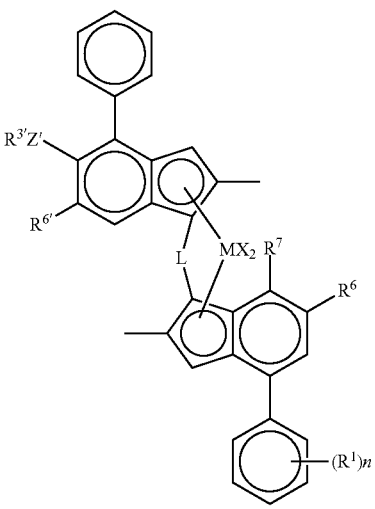

(III)

M is zirconium or hafnium;
each X is a sigma ligand, preferably each X is independently a hydrogen atom, a halogen atom, $C_{1-6}$ alkoxy group, $C_{1-6}$ alkyl, phenyl or benzyl group;
L is a divalent bridge selected from —R'$_2$C— or —R'$_2$Si— wherein each R' is independently a hydrogen atom, $C_{1-20}$ alkyl or $C_{3-10}$ cycloalkyl;
$R^6$ is hydrogen or a $C_{1-10}$ alkyl group;
$R^{6'}$ is a $C_{1-10}$ alkyl group or $C_{6-10}$ aryl group, preferably a tertiary alkyl group;
$R^7$ is hydrogen, $C_{1-6}$ alkyl or $OC_{1-6}$ alkyl;
Z' is O or S;
$R^{3'}$ is a $C_{1-10}$ alkyl group, or $C_{6-10}$ aryl group optionally substituted by one or more halo groups;
n is independently 0 to 4, e.g. 0, 1 or 2; and
each $R^1$ is independently a $C_{1-10}$ alkyl group.

Further preferred complexes of use in the invention are of formula (IV') or (IV):

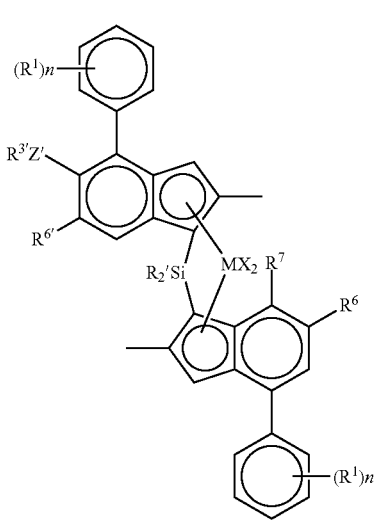

(IV')

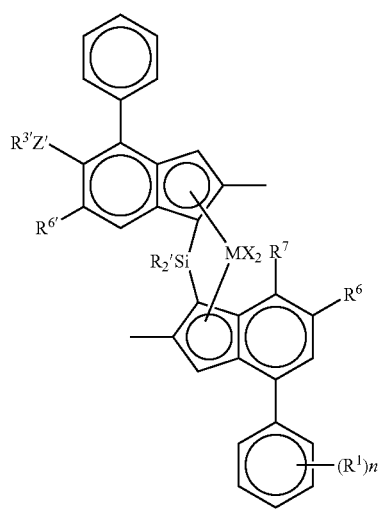

(IV)

M is zirconium or hafnium;

each X is a sigma ligand, preferably each X is independently a hydrogen atom, a halogen atom, $C_{1-6}$-alkoxy group, $C_{1-6}$-alkyl, phenyl or benzyl group;

each R' is independently a hydrogen atom, $C_{1-20}$ alkyl or $C_{3-7}$ cycloalkyl;

$R^6$ is hydrogen or a $C_{1-10}$ alkyl group;

$R^{6'}$ is a $C_{1-10}$ alkyl group or $C_{6-10}$ aryl group, preferably a tertiary alkyl group;

$R^7$ is hydrogen, $C_{1-6}$ alkyl or $OC_{1-6}$ alkyl;

Z' is O or S;

$R^{3'}$ is a $C_{1-10}$ alkyl group, or $C_{6-10}$ aryl group optionally substituted by one or more halo groups;

n is independently 0, 1 to 2; and each $R^1$ is independently a $C_{3-8}$ alkyl group.

Most especially, the complex of use in the invention is of formula (V') or (V):

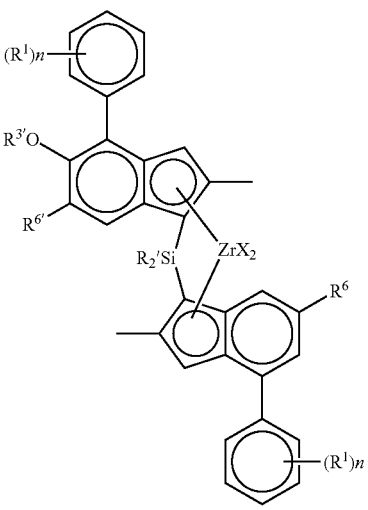

(V')

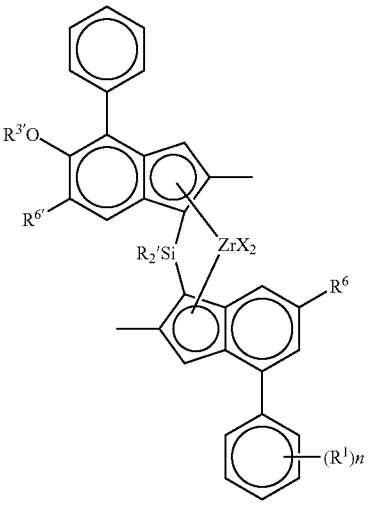

(V)

wherein each X is a sigma ligand, preferably each X is independently a hydrogen atom, a halogen atom, $C_{1-6}$-alkoxy group, $C_{1-6}$-alkyl, phenyl or benzyl group;

R' is independently a $C_{1-6}$ alkyl or $C_{3-10}$ cycloalkyl;

$R^1$ is independently $C_{3-8}$ alkyl;

$R^6$ is hydrogen or a $C_{3-8}$ alkyl group;

$R^{6'}$ is a $C_{3-8}$ alkyl group or $C_{6-10}$ aryl group, preferably a tertiary $C_{4-8}$ alkyl group;

$R^{3'}$ is a $C_{1-6}$ alkyl group, or $C_{6-10}$ aryl group optionally substituted by one or more halo groups; and n is independently 0, 1 or 2.

Particular compounds of the invention include:
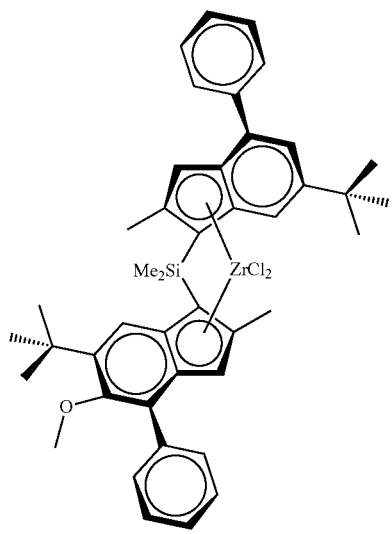
rac-anti-Me₂Si(2-Me-4-Ph-6-tBu-Ind)
(2-Me-4-Ph-5-OMe-6-tBu-Ind)ZrCl₂
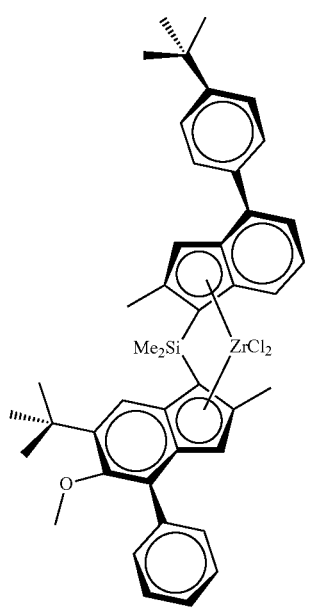
rac-anti-Me₂Si(2-Me-4-(p-tBuPh)-Ind)
(2-Me-4-Ph-5-OMe-6-tBu-Ind)ZrCl₂
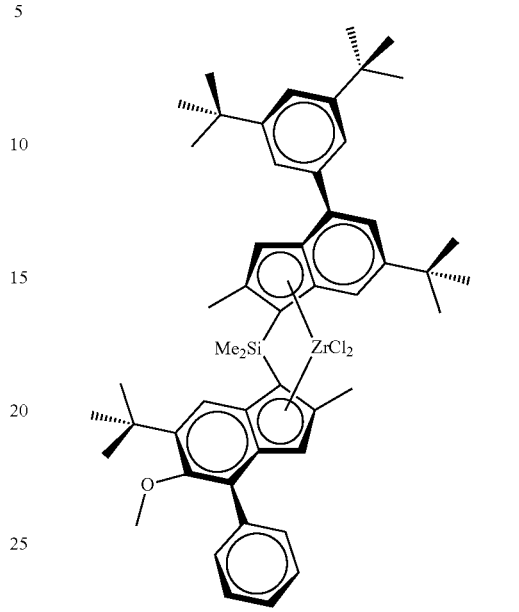
rac-anti-Me₂Si(2-Me-4-(3,5-di-tBuPh)-6-tBu-Ind)
(2-Me-4-Ph-5-OMe-6-tBu-Ind)ZrCl₂
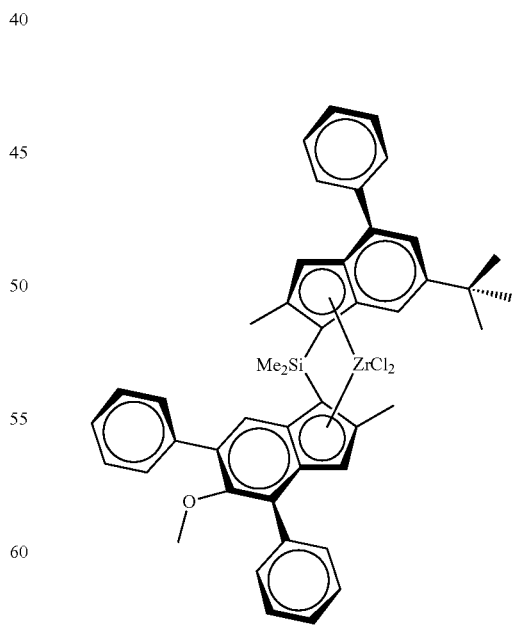
rac-anti-Me₂Si(2-Me-4-Ph-6-tBu-Ind)
(2-Me-4,6-di-Ph-5-OMe-Ind)ZrCl₂

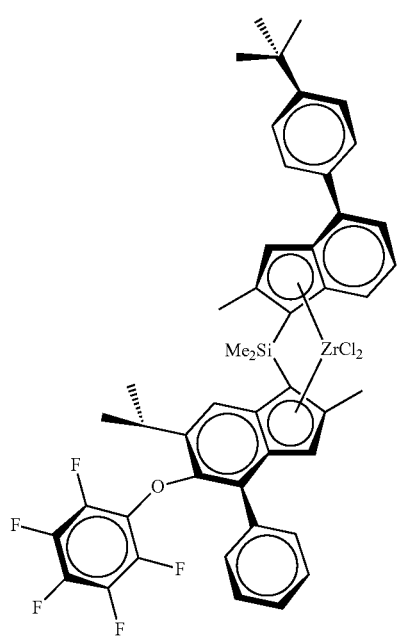
rac-anti-Me₂Si(2-Me-4-(p-tBuPh)-Ind)
(2-Me-4-Ph-5-OC₆F₅)-6-iPr-Ind)ZrCl₂
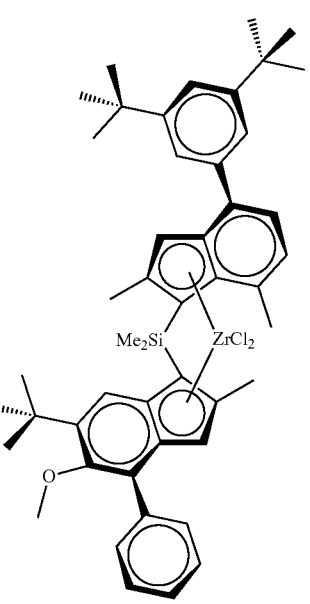
rac-anti-Me₂Si(2-Me-4-(3,5-di-tBuPh)-7-Me-Ind)
(2-Me-4-Ph-5-OMe-6-tBu-Ind)ZrCl₂
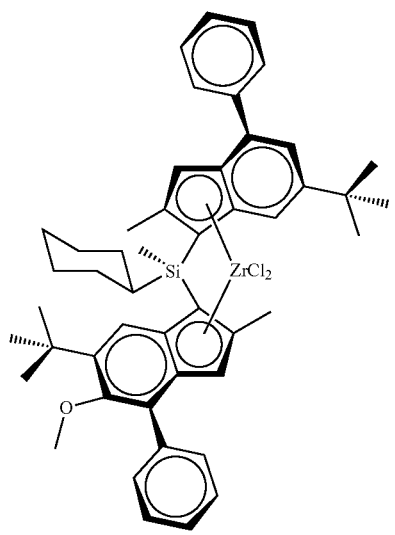
rac-anti-Me(CyHex)Si(2-Me-4-Ph-6-tBu-Ind)
(2-Me-4-Ph-5-OMe-6-tBu-Ind)ZrCl₂
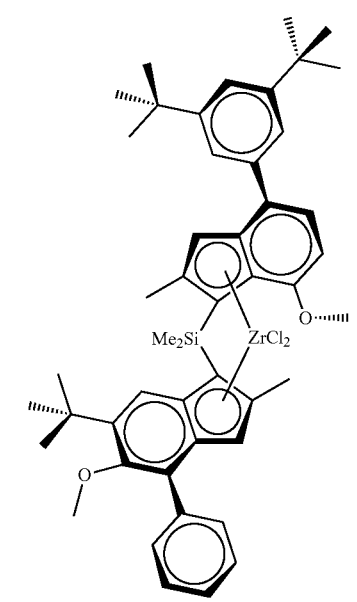
rac-anti-Me₂Si(2-Me-4-(3,5-di-tBuPh)-7-OMe-Ind)
(2-Me-4-Ph-5-OMe-6-tBu-Ind)ZrCl₂

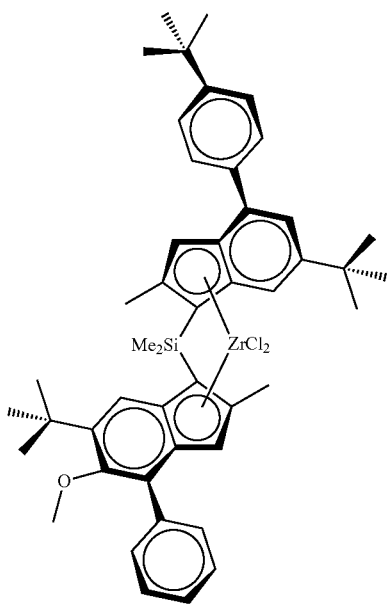

rac-anti-Me$_2$Si(2-Me-4-(p-tBuPh)-6-tBu-Ind)
(2-Me-4-Ph-5-OMe-6-tBu-Ind)ZrCl$_2$

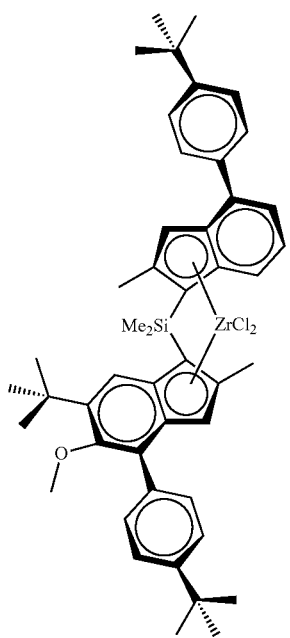

rac-anti-Me$_2$Si(2-Me-4-(p-tBuPh)-Ind)
(2-Me-4-(4-tBuPh)-5-OMe-6-tBu-Ind)ZrCl$_2$

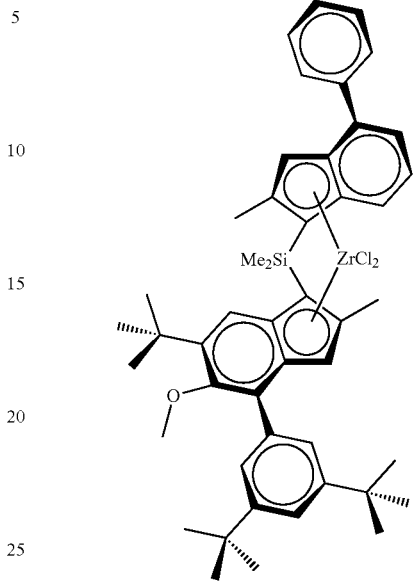

rac-anti-Me$_2$Si(2-Me-4-(p-tBuPh)-Ind)
(2-Me-4-(3,5-tBu2Ph)-5-OMe-6-tBu-Ind)ZrCl$_2$

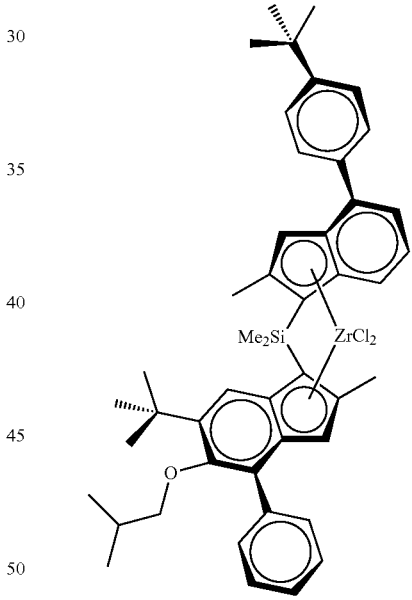

rac-anti-Me$_2$Si(2-Me-4-(p-tBuPh)-Ind)
(2-Me-4-Ph-5-OiBu-6-tBu-Ind)ZrCl$_2$

Most preferably rac-anti-Me$_2$Si(2-Me-4-(p-tBuPh)-Ind)(2-Me-4-Ph-5-OMe-6-tBu-Ind)ZrCl$_2$ is used The synthesis of these materials is described in WO2013/007650.

Cocatalyst

To form an active catalytic species it is normally necessary to employ a cocatalyst as is well known in the art. Cocatalysts comprising one or more compounds of Group 13 metals, like organoaluminium compounds or borates used to activate metallocene catalysts are suitable for use in this invention. Thus the cocatalyst is preferably an alumoxane, like MAO. Borate cocatalysts can also be employed.

The use of $B(C_6F_5)_3$, $C_6H_5N(CH_3)_2H:B(C_6F_5)_4$, $(C_6H_5)_3C:B(C_6F_5)_4$ or $Ni(CN)_4[B(C_6F_5)_3]_4{}^{2-}$ is especially preferred. Suitable cocatalysts are described in WO2013/007650.

Suitable amounts of cocatalyst will be well known to the skilled man.

Manufacture

The catalyst used to manufacture the $C_2C_3$ random copolymers of the invention is ideally provided in solid particulate form but unsupported, i.e. no external carrier is used. In order to provide the catalyst of the invention in solid form but without using an external carrier, it is preferred if a liquid liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape and particle size and without using any added external porous support material, such as an inorganic oxide, e.g. silica. Also desirable surface properties can be obtained. WO2013/007650 again contains comprehensive details of this process.

Catalyst Prepolymerization

The use of the heterogeneous, non-supported catalysts, (i.e. "self-supported" catalysts) might have, as a drawback, a tendency to dissolve to some extent in the polymerization media, i.e. some active catalyst components might leach out of the catalyst particles during slurry polymerization, whereby the original good morphology of the catalyst might be lost. These leached catalyst components are very active possibly causing problems during polymerization. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerization which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "prepolymerize" the catalyst before using it in polymerization process. It has to be noted that prepolymerization in this regard is part of the catalyst preparation process, being a step carried out after a solid catalyst is formed. This catalyst prepolymerization step is not part of the actual polymerization configuration, which might comprise a conventional process prepolymerization step as well. After the catalyst prepolymerization step, a solid catalyst is obtained and used in polymerization.

Catalyst "prepolymerization" takes place following the solidification step of the liquid-liquid emulsion process hereinbefore described. Prepolymerization may take place by known methods described in the art, such as that described in WO 2010/052263, WO 2010/052260 or WO 2010/052264. Preferable embodiments of this aspect of the invention are described herein.

As monomers in the catalyst prepolymerization step preferably alpha-olefins are used. Preferable $C_2$-$C_{10}$ olefins, such as ethylene, propylene, 1-butene, 1-pentene, 1-hexene, 4-methyl-1-pentene, 1-heptene, 1-octene, 1-nonene 1-decene, styrene and vinylcyclohexene are used. Most preferred alpha-olefins are ethylene and propylene.

The catalyst prepolymerization may be carried out in gas phase or in an inert diluent, typically oil or fluorinated hydrocarbon, preferably in fluorinated hydrocarbons or mixture of fluorinated hydrocarbons. Preferably perfluorinated hydrocarbons are used. The melting point of such (per)fluorinated hydrocarbons is typically in the range of 0 to 140° C., preferably 30 to 120° C., like 50 to 110° C.

Where the catalyst prepolymerization is done in fluorinated hydrocarbons, the temperature for the prepolymerization step is below 70° C., e.g. in the range of −30 to 70° C., preferably 0-65° C. and more preferably in the range 20 to 55° C.

Pressure within the prepolymerization vessel is preferably higher than atmospheric pressure to minimize the eventual leaching of air and/or moisture into the catalyst vessel. Preferably the pressure is in the range of at least 1 to 15 bar, preferably 2 to 10 bar. The prepolymerization vessel is preferably kept in an inert atmosphere, such as under nitrogen or argon or similar atmosphere.

Prepolymeriztaion is continued until the prepolymerization degree defined as weight of polymer matrix/weight of solid catalyst before prepolymerization step is reached. The degree is below 25, preferably 0.5 to 10.0, more preferably 1.0 to 8.0, most preferably 2.0 to 6.0.

Use of the catalyst prepolymerization step offers the advantage of minimising leaching of catalyst components and thus local overheating.

After prepolymerization, the catalyst can be isolated and stored.

The present invention is not only related to the inventive $C_2C_3$ random copolymer composition itself, but also to its use and to articles comprising the inventive $C_2C_3$ random copolymer composition.

The $C_2C_3$ random copolymer composition may contain additives known in the art, like antioxidants, nucleating agents, slip agents and antistatic agents. Typically the $C_2C_3$ random copolymer composition may contain not more than 7 wt %, yet more preferably not more than 5 wt %, like not more than 2.5 wt % of additives mentioned herein.

Thus, in a fourth aspect the invention is related to the use of the above defined $C_2C_3$ random copolymer composition for preparing articles.

Suitable articles are films for flexible packaging systems, such as bags or pouches for food and pharmaceutical packaging or medical articles in general.

Preferred articles are films, which may be unoriented or oriented and which can be obtained by any process known to an art skilled person, like cast film technology of extrusion blown film technology.

The films are preferably used in multilayer film structures as sealing layer, preferably as very thin sealing layer, on top of the multilayer structure.

Description of Film Production by Blown Film Technology

The above described $C_2C_3$ random copolymer composition is capable of being manufactured into water or air quench blown films, preferably air quenched blown films, on typical polyethylene blown film production equipment.

In principle the process comprising the steps of
(i) blowing up a tube of molten material with air perpendicularly to the upwards direction from a side-fed blown film die;

(ii) cooling it down with water contact cooling ring or air quench;
(iii) folding it and guiding it over deflector rolls onto the winder Blown Film Technology with Water Contact Cooling Ring In this technology for producing polymer films, the molten blend is extruded through a tubular die fed by a (usually single-screw) extruder and blown up to a tube. The film tube has contact on the exterior side to a water cooling ring and is cooled down quickly. The already solidified film tube is flattened afterwards by take-up rolls and taken off to a winder.

For a more detailed description see "Polypropylene Handbook", edited by Edward P. Moore, Jr., Hanser Publishers, 1996.

Blown Film Technology with Air Quench

In this manufacturing step for air quenched blown films the film is made using at least a 1.5 blow up ratio, preferably at least a 2.0 blow up ratio, more preferably at least a 2.5 blow up ratio.

The technique of air quenched blown film extrusion is well known for the production of thin plastic films. In an advantageous process, above described blends are extruded through a circular die to form a film. Air is introduced through the center of the die to maintain the film in the form of a bubble which increases the diameter of the film about 1.5 to 6 fold, after which the bubble is collapsed onto rolers. There are a number of variations of such a process within the skill in the art. Most references to blowing polyolefin films disclose processes used for polyethylene, but these are applicable to the above described $C_2C_3$ random copolymer composition within few modifications within the skill in the art without undue experimentation.

For instance cooling is often advantageously modified because the art recognizes that polypropylene cools and crystallizes at a rate different from that of polyethylene.

Therefore, adjustments to the cooling parameters often produce a more stable bubble at desired output rates.

In the formation of blown films, the melted blend (melt) enters a ring-shaped die either through the bottom or side thereof. The melt is forced through spiral grooves around the surface of a mandrel inside the die and extruded through the die opening as a thick-walled tube. The tube is expanded into a bubble of desired diameter and correspondingly decreased thickness as previously described.

Description of Film Production by Cast Film Technology

In this most simple technology for producing polymer films, the molten composition is extruded through a slot die fed by a (normally single-screw) extruder onto a first cooled roll, the so called chill-roll. From this roll, the already solidified film is taken up by a second roll (nip roll or take-up roll) and transported to a winding device after trimming the edges. Only a very limited amount of orientation is created in the film, which is determined by the ratio between die thickness and film thickness or the extrusion speed and the take-up speed, respectively.

Due to its technical simplicity, cast film technology is a very economical and easy-to-handle process. The films resulting from this technology are characterised by good transparency and rather isotropic mechanical properties (limited stiffness, high toughness).

Mono-layer films having a thickness of 5 to 300 µm, preferably 10 to 200 µm, more preferably 20 to 150 µm are suitable according to the present invention.

Films according to the present invention may be non-oriented, mono-axially or bi-axially oriented, depending on their end-use.

Especially preferred are cast-films.

Following their production films comprising the $C_2C_3$ random copolymer composition may be subjected to a surface energy increasing treatment, such as for example chemical treatment, flame-treatment, plasma-treatment and Corona-treatment.

Films comprising the above defined $C_2C_3$ random copolymer composition have a low seal initiation temperature (SIT), beneficial optical properties and at the same time high relative tear resistance in machine direction as well as in transverse direction.

Therefore, in a fifth aspect the invention is related to films comprising the above defined $C_2C_3$ random copolymer composition, whereby the films are characterized by
(i) a seal initiation temperature (SIT) (determined as described in the experimental part) of below 110° C.
(ii) satisfying the equation $T_m-SIT \geq 25$, wherein Tm is the melting point of the $C_2C_3$ random copolymer composition
(iii) a haze (determined according to ASTM D1003-00 on cast films with a thickness of 50 µm) of at most 2.5%
(iv) a transparency (determined according to ASTM D1003-00 on cast films with a thickness of 50 µm) of at least 90.0%
(v) a relative tear resistance in machine direction [N/mm] according to Elmendorf method (ISO 6383-2) for a cast film thickness of 50 µm of at least 28.0 N/mm and
vi) a relative tear resistance in transverse direction [N/mm] according to Elmendorf method (ISO 6383-2) for a cast film thickness of 50 µm of at least 200.0 N/mm.

The films comprising the inventive $C_2C_3$ random copolymer composition have a seal initiation temperature (SIT) of below 110° C. and satisfy the equation $T_m-SIT \geq 25$.

Preferably the films satisfy the equation $T_m-SIT \geq 27$, more preferably $T_m-SIT \geq 29$.

Tm is the melting point of the $C_2C_3$ random copolymer composition.

The haze of the films according to the invention is at most 2.5%, preferably at most 2.2%.

The relative tear resistance in machine direction [N/mm] according to Elmendorf method (ISO 6383-2) for a cast film thickness of 50 µm is at least 28.0 N/mm, preferably at least 30 N/mm.

The relative tear resistance in transverse direction [N/mm] according to Elmendorf method (ISO 6383-2) for a cast film thickness of 50 µm is at least 200.0 N/mm, preferably at least 220.0 N/mm.

The films according to the present invention are especially suitable as sealing layer in a multi-layer film construction, as they have a low SIT and a broad sealing window as well as beneficial optical properties.

A multi-layer film construction comprising at least one layer comprising the inventive $C_2C_3$ random copolymer composition is preferably produced by multi-layer co-extrusion followed by film casting or film blowing. In this case, at least one of the outermost layers of said multi-layer film construction serving as sealing layer(s) shall comprise the inventive $C_2C_3$ random copolymer composition as defined above. The inventive multilayer film construction shall preferably have a thickness in the range of 30 to 500 µm, more preferably in the range of 50 to 400 µm, like in the range of 60 to 300 µm. The sealing layer(s) comprising the inventive $C_2C_3$ random copolymer composition shall preferably have a thickness in the range of 3 to 50 µm, more preferably in the range of 5 to 30 µm, like in the range of 8 to 25 µm.

Furthermore films, respectively articles according to the present invention comprising the above defined $C_2C_3$ random copolymer composition are suitable for being sterilized without negatively affecting the optical properties.

Therefore the present invention is also directed to a sterilizable or sterilized article, preferably to a sterilizable or sterilized film, like a sterilizable or sterilized film. More preferably the invention is directed to containers, i.e. pouches, especially to steam sterilizable or steam sterilized containers, i.e. pouches, preferably comprising, more preferably consisting of, the film as defined herein. The container is in particular a pouch. Further said container, i.e. pouch, has been preferably subjected to a steam sterilization treatment in a temperature range of about 120 to 130° C.

The films according to the invention have a haze value (determined according to ASTM D1003-00 on cast films with a thickness of 50 μm) after sterilization at 121° C. for 30 min of at most 25%, preferably of at most 20% and a transparency (determined according to ASTM D1003-00 on cast films with a thickness of 50 μm) after sterilization at 121° C. for 30 min of at least 90.0%.

EXPERIMENTAL PART

A) Methods

The following definitions of terms and determination methods apply for the above general description of the invention as well as to the below examples unless otherwise defined.

$MFR_2$ (230° C.) is measured according to ISO 1133 (230° C., 2.16 kg load).

Comonomer Content

The comonomer content was determined by quantitative Fourier transform infrared spectroscopy (FTIR) after basic assignment calibrated via quantitative $^{13}C$ nuclear magnetic resonance (NMR) spectroscopy in a manner well known in the art. Thin films are pressed to a thickness of between 100-500 micrometer and spectra recorded in transmission mode.

Specifically, the ethylene content of a polypropylene-co-ethylene copolymer is determined using the baseline corrected peak area of the quantitative bands found at 720-722 and 730-733 $cm^{-1}$.

Quantitative results are obtained based upon reference to the film thickness.

The comonomer content is herein assumed to follow the mixing rule (equation 2):

$$C_b = w_1 \cdot C_1 + w_2 \cdot C_2 \quad (eq. 2)$$

Where C is the content of comonomer in weight-%, w is the weight fraction of the component in the mixture and subscripts b, 1 and 2 refer to the overall mixture, component 1 and component 2, respectively.

As it is well known to the person skilled in the art the comonomer content in weight basis in a binary copolymer can be converted to the comonomer content in mole basis by using the following equation $$c_m = \frac{1}{1 + \left(\frac{1}{c_w} - 1\right) \cdot \frac{MW_c}{MW_m}} \quad (eq. 3)$$

where $c_m$ is the mole fraction of comonomer units in the copolymer, $c_w$ is the weight fraction of comonomer units in the copolymer, $MW_c$ is the molecular weight of the comonomer (such as ethylene) and $MW_m$ is the molecular weight of the main monomer (i.e., propylene).

The Xylene Solubles (XCS, Wt %):

Content of xylene cold solubles (XCS) is determined at 25° C. according ISO 16152; first edition; 2005 Jul. 1. The part which remains insoluble is the xylene cold insoluble (XCI) fraction.

Calculation of Comonomer Content and $MFR_2$ (230° C.) of the Individual Propylene Polymer Fractions B and C, Respectively Calculation of the Amount of the Comonomer Content of the Polymer Fraction B:

$$\frac{C(P1+P2) - w(P1) \times C(P1)}{w(P2)} = C(P2) \quad (I)$$

wherein w(P1) is the weight fraction [in wt %] of the polymer fraction A in the blend of polymer fractions A and B, w(P2) is the weight fraction [in wt %] of the polymer fraction B in the blend of polymer fractions A and B, C(P1) is the comonomer content [in wt %] of the polymer fraction A, C(P1+P2) is the comonomer content [in wt %] of the blend of polymer fractions A and B, C(P2) is the calculated comonomer content [in wt %] of the polymer fraction B.

Calculation of the Amount of Xylene Solubles XS of the Polymer Fraction B:

$$\frac{XS(P1+P2) - w(P1) \times XS(P1)}{w(P2)} = XS(P2) \quad (II)$$

wherein w(P1) is the weight fraction [in wt %] of the polymer fraction A in the blend of polymer fractions A and B, w(P2) is the weight fraction [in wt %] of the polymer fraction B in the blend of polymer fractions A and B, XS(P1) is the amount of xylene solubles XS [in wt %] of the polymer fraction A, XS(P1+P2) is the amount of xylene solubles XS [in wt %] of the blend of polymer fractions A and B, XS(P2) is the calculated amount of xylene solubles XS [in wt %] of the polymer fraction B.

Calculation of Melt Flow Rate $MFR_2$ (230° C.) of the Polymer Fraction B:

$$MFR(P2) = 10^{\left[\frac{\log(MFR(P1+P2)) - w(P1) \times \log(MFR(P1))}{w(P2)}\right]} \quad (III)$$

wherein w(P1) is the weight fraction [in wt %] of the polymer fraction A in the blend of polymer fractions A and B, w(P2) is the weight fraction [in wt %] of the polymer fraction B in the blend of polymer fractions A and B, MFR(P1) is the melt flow rate $MFR_2$ (230° C.) [in g/10 min] of the polymer fraction A, MFR(P1+P2) is the melt flow rate $MFR_2$ (230° C.) [in g/10 min] of the blend of polymer fractions A and B, MFR(P2) is the calculated melt flow rate $MFR_2$ (230° C.) [in g/10 min] of the polymer fraction B.

Calculation of Comonomer Content of the Polymer Fraction C:

$$\frac{C(P1+P2+P3) - w(P1+P2) \times C(P1+P2)}{w(P3)} = C(P3) \quad \text{(IV)}$$

wherein w(P1+P2) is the weight fraction [in wt %] of the amount of polymer fractions A and B in the blend of polymer fractions A, B and C, w(P3) is the weight fraction [in wt %] of the polymer fraction C in the blend of polymer fractions A, B and C, C(P1+P2) is the comonomer content [in wt %] of the blend of polymer fractions A and B, C(P1+P2+P3) is the comonomer content [in wt %] of the blend of polymer fractions A, B and C, C(P3) is the calculated comonomer content [in wt %] of the polymer fraction C.

The hexane extractable fraction is determined according to FDA method (federal registration, title 21, Chapter 1, part 177, section 1520, s. Annex B) on cast films of 100 μm thickness produced on a monolayer cast film line with a melt temperature of 220° C. and a chill roll temperature of 40° C. The extraction was performed at a temperature of 50° C. and an extraction time of 30 min.

Melting Temperature ($T_m$) and Crystallization Temperature ($T_c$):

The melting temperature Tm and crystallisation temperature Tc were measured with a TA Instruments Q2000 differential scanning calorimetry device (DSC) according to ISO 11357/3 on 5 to 10 mg samples. Crystallisation and melting temperatures were obtained in a heat/cool/heat cycle with a scan rate of 10° C./min between 30° C. and 225° C. Melting and crystallisation temperatures were taken as the peaks of the endotherms and exotherms in the cooling cycle and the second heating cycle respectively.

Dynamic Mechanical thermal Analysis (DMTA) is a method for determination of linear dynamic mechanical properties of polymers.

Glass transition temperature Tg and storage modulus G' were determined by dynamic mechanical analysis (DMTA) according to ISO 6721-7. The measurements were done in torsion mode on compression moulded samples (40×10×1 mm3) between −100° C. and +150° C. with a heating rate of 2° C./min and a frequency of 1 Hz. The Tg was recorded as peak maxima of the loss angle curve (tan(δ)).

TREF Method: (Running with Method "Standard 180-35° C."):

The chemical composition distribution was determined by analytical Temperature Rising Elution fractionation as described by Soares, J. B. P., Fractionation, In: Encyclopedia Of Polymer Science and Technology, John Wiley & Sons, New York, pp. 75-131, Vol. 10, 2001. The separation of the polymer in TREF is according to their crystallinity in solution. The TREF profiles were generated using a CRYSTAF-TREF 200+ instrument manufactured by PolymerChar S.A. (Valencia, Spain).

The polymer sample was dissolved in 1,2,4-trichlorobenzene (TCB, stabilized with 250 mg/L 2,6-Di tert butyl-4-methyl-phenol) at a concentration between 1.5 and 2.0 mg/ml at 150° C. for 180 min and 1.8 mL of the sample solution was injected into the column (8 mm inner diameter, 15 cm length, filled with inert e.g. glass beads). The column oven was then rapidly cooled to 110° C. and held at 110° C. for 30 min for stabilization purpose and it was later slowly cooled to 35° C. under a constant cooling rate (0.1° C./min). The polymer was subsequently eluted from the column with 1,2,4-trichlorobenzene (stabilized with 250 mg/L 2,6-di-tert-butyl-4-methyl-phenol) at a flow rate of 0.5 mL/min at 35° C. for a period of 10 min followed by a temperature increase from 35° C. to 135° C. at a constant heating rate of 0.5° C./min with a flow rate of 0.5 ml/min. The concentration of the polymer during elution was recorded by an infrared detector (measuring the C—H absorption at 3.5 micrometer wavelength). The detector response was plotted as a function of the temperature. The normalized concentration plot was presented as fractogram together with the cumulative concentration signal normalized to 100.

Tear Resistance (Determined as Elmendorf Tear (N)):

Applies for the measurement both in machine direction and in transverse direction. The tear strength is measured using the ISO 6383/2 method. The force required to propagate tearing across a film sample is measured using a pendulum device. The pendulum swings under gravity through an arc, tearing the specimen from pre-cut slit. The specimen is fixed on one side by the pendulum and on the other side by a stationary clamp. The tear resistance is the force required to tear the specimen. The relative tear resistance (N/mm) is then calculated by dividing the tear resistance by the thickness of the film.

Sealing Initiation Temperature (SIT); (Sealing End Temperature (SET), Sealing Range):

The method determines the sealing temperature range (sealing range) of polypropylene films, in particular blown films or cast films. The sealing temperature range is the temperature range, in which the films can be sealed according to conditions given below. The lower limit (heat sealing initiation temperature (SIT)) is the sealing temperature at which a sealing strength of >3 N is achieved. The upper limit (sealing end temperature (SET)) is reached, when the films stick to the sealing device. The sealing range is determined on a J&B Universal Sealing Machine Type 3000 with a film of 50 μm thickness with the following further parameters:

| | |
|---|---|
| Specimen width: | 25.4 mm |
| Seal Pressure: | 0.1 N/mm$^2$ |
| Seal Time: | 0.1 sec |
| Cool time: | 99 sec |
| Peel Speed: | 10 mm/sec |
| Start temperature: | 80° C. |
| End temperature: | 150° C. |
| Increments: | 10° C. |

Specimen is sealed A to A at each sealbar temperature and seal strength (force) is determined at each step. The temperature is determined at which the seal strength reaches 3 N.

Haze, Transparency and Clarity

Haze, transparency and clarity of cast films was measured according to ASTM D 1003 on 50 μm thick cast films and on injection moulded specimens of 60×60×1 mm prepared according to EN ISO 1873-2 using a melt temperature of 200° C.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature until being processed further.

B) Examples

The catalyst used in the polymerization processes for the $C_2C_3$ random copolymer composition of the inventive example (IE1) and (IE2) was prepared as follows:

The catalyst used has been prepared following the general procedures described in WO2013/007650 to prepare catalyst E2P, using the same metallocene complex (E2 in WO2013/007650) rac-anti-dimethylsilanediyl(2-methyl-4-(4'-tert-butylphenyl)inden-1-yl)(2-methyl-4-phenyl-5-methoxy-6-tert-butylinden-1-yl) zirconium dichloride (MC1). Its composition is indicated in table 1 below:

TABLE 1

| Catalyst | Al/Zr (molar ratio) in unprepped catalys | Degree of prepping | MC in prepped cat |
|---|---|---|---|
| MC1 | 250 | 3.5 | 1.12 |

Catalyst Synthesis:

Inside the glovebox, 80.0 µl of dry and degassed FluorN 474 was mixed with 2 mL of MAO in a septum bottle and left to react overnight. The following day, 58.7 mg of the metallocene (0.076 mmol, 1 equivalent) was dissolved with 4 mL of the MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (300 equivalents). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.81 g of a red solid catalyst was obtained.

Catalyst off-line prepolymerization (Prepping): The above catalyst was pre-polymerized according to the following procedure: Off-line pre-polymerization experiment was done in a 125 mL pressure reactor equipped with gas-feeding lines and an overhead stirrer. Dry and degassed perfluoro-1.3-dimethylcyclohexane (15 cm$^3$) and 801.7 mg of the catalyst to be pre-polymerized were loaded into the reactor inside a glove box and the reactor was sealed. The reactor was then taken out from the glove box and placed inside a water cooled bath kept at 25° C. The overhead stirrer and the feeding lines were connected and stirring speed set to 450 rpm. The experiment was started by opening the propylene feed into the reactor. The propylene feed was left open and the monomer consumption was compensated by keeping the total pressure in the reactor constant (about 5 barg). The experiment was continued until a polymerization time (17 min.) sufficient to provide the desired degree of polymerization (DP=3.5). The reaction was stopped by flashing the volatile components. Inside the glove box, the reactor was opened and the content poured into a glass vessel. The perfluoro-1.3-dimethylcyclohexane was evaporated until a constant weight was obtained to yield 3.59 g of the pre-polymerized catalyst.

The polymerization for preparing the inventive $C_2C_3$ random copolymer compositions was performed in a Borstar pilot plant with a 3-reactor set-up (loop-gas phase reactor (GPR 1)-gas phase reactor (GPR 2)

In Table 2 the polymerization conditions for IE-1 and IE-2 are given.

TABLE 2

| Polymerization conditions | | IE-1 | IE-2 |
|---|---|---|---|
| Loop (fraction (A)) | | | |
| Temperature | [° C.] | 70 | 70 |
| Pressure | [kPa] | 53 | 53 |
| Residence time | [h] | 0.54 | 0.53 |
| Split | [%] | 50 | 40 |
| H2/C3 ratio | [mol/kmol] | 0.77 | 0.8 |
| C2/C3 ratio | [mol/kmol] | 11.4 | 11.2 |
| MFR$_2$ | [g/10 min] | 11.6 | 10.4 |
| XCS | [wt %] | 1.2 | 0.9 |
| C2 content | [wt %] | 0.82 | 0.9 |
| GPR 1 (fraction (B)) | | | |
| Temperature | [° C.] | 70 | 70 |
| Pressure | [kPa] | 21 | 21 |
| Residence time | [h] | 0.29 | 0.38 |
| Split | [%] | 37 | 34 |
| H2/C3 ratio | [mol/kmol] | 6.6 | 8.1 |
| C2/C3 ratio | [mol/kmol] | 245 | 239 |
| MFR$_2$ GPR 1 | [g/10 min] | 11.6 | 13.9 |
| XCS | [wt %] | 10.6 | 5.0 |
| C2 content total | [wt %] | 3.7 | 3.66 |
| C2 made in GPR 1 | [wt %] | 7.5 | 6.1 |
| GPR 2 (fraction (C)) | | | |
| Temperature | [° C.] | 70 | 70 |
| Pressure | [kPa] | 18 | 18 |
| Residence time | [h] | 1.8 | 0.53 |
| Split | [%] | 13 | 26 |
| C2/C3 ratio | [mol/kmol] | 550 | 550 |
| H2/C2 ratio | [mol/kmol] | 8.6 | 8.2 |
| MFR$_2$ GPR 2 | [g/10 min] | 7.05 | 7.50 |
| XCS | [wt %] | 19.8 | 23.6 |
| C2 content total | [wt %] | 4.9 | 4.4 |
| C2 made in GPR 2 | [wt %] | 10.6 | 8.3 |

All polymer powders were compounded in a co-rotating twin-screw extruder Coperion ZSK 57 at 220° C. with 0.2 wt % antiblock agent (synthetic silica; CAS-no. 7631-86-9); 0.1 wt % antioxidant (Irgafos 168FF); 0.1 wt % of a sterical hindered phenol (Irganox 1010FF); 0.02 wt % of Ca-stearat) and 0.02 wt % of a non-lubricating stearate (Synthetic hydrotalcite; CAS-no. 11097-59-9)

As Comparative Examples (CE-1 and CE-2) 2 commercially available polymers suitable for sealing layers were used:

Comparative Example 1 (CE-1)

RE239CF: random ethylene-propylene copolymer of *Borealis* AG; having a melt flow rate MFR2 (230° C.) of 11 g/10 min, a melting temperature Tm of 140° C.

Comparative Example 2 (CE-2)

TD215BF: sealing grade of *Borealis* AG; propylene-ethylene-1-butene terpolymer (CAS-No. 25895-47-0), having a melt flow rate MFR2 (230° C.) of 6 g/10 min, a melting temperature Tm of 130° C.

In Table 3 the properties of the polymers of IE-1, IE-2, CE-1 and CE-2 are shown:

TABLE 3

| Parameter | unit | IE-1 | IE-2 | CE-1 | CE-2 |
|---|---|---|---|---|---|
| Melting temperature Tm | [° C.] | 136.7 | 136.2 | 140 | 130 |
| Crystallization temperature Tc | [° C.] | 98.3 | 97.9 | 97.2 | 91.2 |
| MFR$_2$ (230° C.) | [g/10 min] | 7.05 | 7.56 | 11.0 | 6.0 |
| C2 content total | [wt %] | 4.6 | 4.7 | 4.6 | 1.0 |
| XCS total | [wt %] | 19.8 | 23.6 | 8.5 | <15 |
| C2 of XCS | [wt %] | 9.6 | 9.2 | n.m. | n.m. |
| n-hexane solubles | [wt %] | 1.52 | 1.34 | 3.76 | 2.33 | n.m. not measured

For the polymer of IE-1, IE-2 and CE-1 optical parameters were measured on a 1 mm injection moulded plate. The results can be seen in Table 4:

TABLE 4

| Parameter | unit | IE-1 | IE-2 | CE-1 |
|---|---|---|---|---|
| Transparency | [%] | 93.4 | 92.9 | 92.4 |
| Haze | [%] | 36.9 | 34.4 | 47.6 |
| Clarity | [%] | 95.2 | 95.6 | 89.8 |

As can be clearly seen from Table 3 and 4, the inventive C$_2$C$_3$ random copolymer compositions show significantly lower amount of hexane-solubles and better optical properties (especially haze) on injection moulded plates.

Compared to the terpolymer of CE-2, the melting temperature of the inventive examples is more than 5 degree higher at lower level of hexane solubles.

Furthermore the polymers of IE-1, IE-2, CE-1 and CE-2 were converted to monolayer cast films with a thickness of 50 μm on a PM30 cast film line (type laboratory extruder provided by Plastik Maschinenbau GmbH., Germany)

The equipment consists of an extruder, chill roll with air knife and a winder.

PP 3-zone screw with a diameter of 30 mm, 25D length, 200 mm die, die gap 0.5 mm Extrusion Parameters:

Extruder temperature profile: 220° C./240° C./250° C./260° C./260° C. (Melt temperature 250° C.; melt pressure 61 bar)

Extruder speed: 50 rpm

Chill roll temperature: 10° C.

take-off speed: 10.2 m/min

In Table 5 the mechanical and optical parameters as well as the sealing performance can be seen

TABLE 5

| Parameter | unit | IE-1 | IE-2 | CE-1 | CE-2 |
|---|---|---|---|---|---|
| Rel. Tear resistance MD | [N/mm] | 32.5 | n.m. | 12.3 | 27.8 |
| Transparency | [%] | 94.3 | n.m. | 94.0 | 93.7 |
| Haze | [%] | 2.1 | n.m. | 2.3 | 1.0 |
| Clarity | [%] | 95.8 | n.m. | 96.0 | 98.2 |
| SIT | [° C.] | 107 | 105 | 117 | 107 |
| Tm - SIT | [° C.] | 29.7 | 31.2 | 22.0 | 24.0 |
| SET | [° C.] | 170 | 175 | 140 | 155 |

As can be seen clearly from Table 5, the sealing initiation temperature (SIT) is at the level of the terpolymer or even lower. The sealing range (Tm-SIT) of the inventive examples is significantly broader than for the comparative examples. (see also FIG. 1).

In FIG. 1 this is also shown. It can be clearly seen that the C$_2$C$_3$ random copolymer compositions of the invention have a broader sealing range than comparative polymers.

The films of IE1-1, CE-1 and CE-2 were furthermore sterilized.

The sterilization was done by subjecting the films to saturated steam of 121° C. for 30 minutes as described above. In order to avoid the films sticking together after the process, the film samples are fixed in frames during the sterilization process.

Optical parameter after sterilization can be seen in Table 6.

TABLE 6

| Parameter | unit | IE-1 | CE-1 | CE-2 |
|---|---|---|---|---|
| Transparency | [%] | 94.4 | 94.0 | 94.2 |
| Haze | [%] | 19.1 | 24.3 | 10.2 |
| Clarity | [%] | 85.8 | 80.0 | 94.2 |

Furthermore DMTA measurements (according to ISO 6721-7) were done.

As can be seen from FIG. 2 the polymers of IE-1 and IE-2 show only one peak visible in the temperature range of 25 to −50° C., which indicates a single phase material.

TREF measurements shown in FIG. 3 show that the C$_2$C$_3$ random copolymers of IE-1 and IE-2 have three peaks:
one in the temperature range of 0-40° C.,
the second one between 60 and 80° C., and
one peak between 80 and 100° C.,
whereas for the polymer of CE-1 does not show the peak between 60 and 80° C., and a much broader one between 80 and 100° C.

The invention claimed is:

1. A C$_2$C$_3$ random copolymer composition comprising 3 polymer fractions (A), (B) and (C) with different comonomer content,
   (A) 30 to 65 wt % of a C$_2$C$_3$ random copolymer with a C$_2$ content (C$_2$A) of 0.4 to 1.5 wt % based on copolymer (A) as measured with Fourier-transform infrared (FTIR) spectroscopy,
   (B) 25 to 50 wt % of a C$_2$C$_3$ random copolymer with a C$_2$ content (C$_2$B) of 3.0 to 10.0 wt % based on copolymer (B) and
   (C) 5 to 35 wt % of a C$_2$C$_3$ random copolymer with a C$_2$ content (C$_2$C) of 7.0 to 15.0 wt % based on copolymer (C),
   whereby the sum of the amount of the 3 polymer fractions (A), (B) and (C) is 100% and
   whereby the comonomer content of the polymer fractions increases from fraction (A) to fraction (C) according to (C$_2$A)<(C$_2$B)<(C$_2$C),
   and whereby the composition is characterized by
   (i) a total C$_2$ content in the range of 3.0 wt % up to 7.0 wt %, as measured with Fourier-transform infrared (FTIR) spectroscopy,
   (ii) a melt flow rate MFR2 (230° C.) measured according to ISO 1133 in the range of 2.0 to 15.0 g/10 min,
   (iii) a melting temperature Tm as determined by DSC according to ISO 11357 of from 128° C. to 145° C.,
   (iv) a crystallization temperature T$_c$ as determined as determined by DSC according to ISO 11357 of from 85° C. to 110° C. and
   (v) a hexane solubles content determined in accordance with FDA section 177.1520 of at most 2.0 wt %.

2. The C$_2$C$_3$ random copolymer composition according to claim 1 being further characterized by only one peak in the temperature range of 25 to −50° C. as determined by dynamic mechanical thermal analysis (DMTA) according to ISO 6721-7, indicating a single phase material and by three peaks in an analytical TREF (temperature rising elution fractionation)-measurement:
one in the temperature range of 0-40° C.,
the second one between 60 and 80° C., and
one peak between 80 and 100° C.

3. The $C_2C_3$ random copolymer composition according to claim 1, whereby the composition is obtained in the presence of a metallocene catalyst.

4. A process for producing a $C_2C_3$ random copolymer composition according to claim 1 by a sequential polymerization process comprising at least two reactors connected in series, wherein the process comprises the steps of
a) polymerizing in a first reactor (R-1) being a slurry reactor (SR), propylene and ethylene, obtaining a $C_2C_3$ random copolymer (A)
b) transferring said $C_2C_3$ random copolymer (A) and unreacted comonomers of the first reactor in a second reactor (R-2) being a first gas phase reactor (GPR-1),
c) feeding to said second reactor (R-2) propylene and ethylene,
d) polymerizing in said second reactor (R-2) and in the presence of said first $C_2C_3$ random copolymer (A) propylene and ethylene obtaining a $C_2C_3$ random copolymer (B),
e) transferring said mixture of $C_2C_3$ random copolymer (A) and $C_2C_3$ random copolymer (B), and unreacted comonomers of the second reactor in a third reactor (R-3) being a second gas phase reactor (GPR-2),
c) feeding to said third reactor (R-3) propylene and ethylene,
d) polymerizing in said third reactor (R-3) and in the presence of the mixture of $C_2C_3$ random copolymer (A) and $C_2C_3$ random copolymer (B) propylene and ethylene obtaining a $C_2C_3$ random copolymer (C),
said $C_2C_3$ random copolymer (A), $C_2C_3$ random copolymer (B) and said $C_2C_3$ random copolymer (C) form the $C_2C_3$ random copolymer composition according to claim 1,
whereby the polymerization takes place in the presence of single site solid particulate catalyst comprising (i) a complex of formula (I):

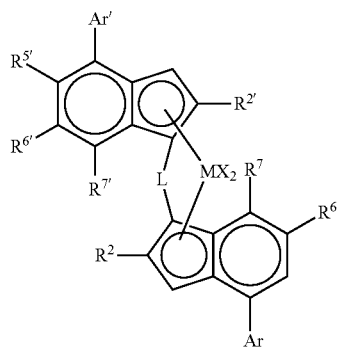

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;

$R^2$ and $R^{2'}$ are each independently a $C_1$-$C_{20}$ hydrocarbyl radical optionally containing one or more heteroatoms from groups 14-16;

$R^{5'}$ is a $C_{1-20}$ hydrocarbyl group containing one or more heteroatoms from groups 14-16 optionally substituted by one or more halo atoms;

$R^6$ and $R^{6'}$ are each independently hydrogen or a $C_{1-20}$ hydrocarbyl group optionally containing one or more heteroatoms from groups 14-16;

$R^7$ is hydrogen or $C_{1-20}$ hydrocarbyl group optionally containing one or more heteroatoms from groups 14-16;

$R^{7'}$ is hydrogen;

Ar is independently an aryl or heteroaryl group having up to 20 carbon atoms optionally substituted by one or more groups $R^1$;

Ar' is independently an aryl or heteroaryl group having up to 20 carbon atoms optionally substituted by one or more groups $R^1$;

each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$;

each $R^4$ is a $C_{1-20}$ hydrocarbyl group;

and (ii) a cocatalyst comprising a compound of a group 13 metal.

5. The process according to claim 4, wherein the a catalyst comprises a complex of formula (III) or (III')

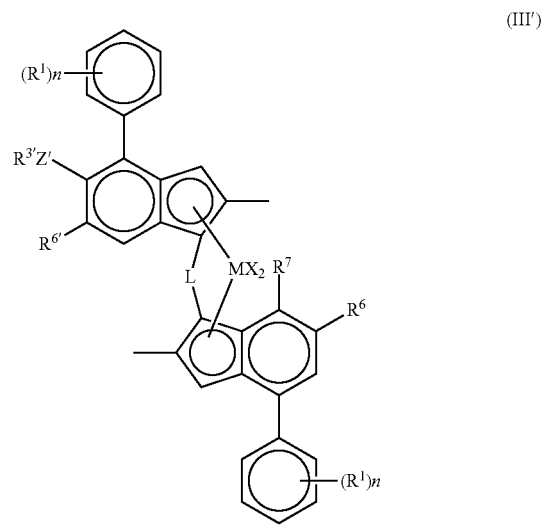

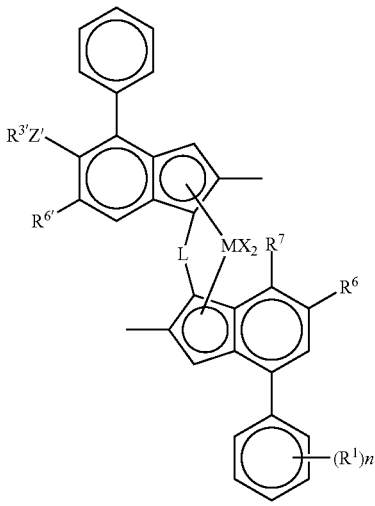

(III)

wherein
M is zirconium or hafnium;
each X is a sigma ligand;
L is a divalent bridge selected from —R'$_2$C— or —R'$_2$Si— wherein each R' is independently a hydrogen atom, C$_{1-20}$ alkyl or C$_{3-10}$ cycloalkyl;
R$^6$ is hydrogen or a C$_{1-10}$ alkyl group;
R$^{6'}$ is a C$_{1-10}$ alkyl group or C$_{6-10}$ aryl group;
R$^7$ is hydrogen, C$_{1-6}$ alkyl or OC$_{1-6}$ alkyl;
Z' is O or S;
R$^{3'}$ is a C$_{1-10}$ alkyl group, or C$_{6-10}$ aryl group optionally substituted by one or more halo groups;
n is independently 0 to 4; and
each R$^1$ is independently a C$_{1-10}$ alkyl group.

6. A process for producing water or air quench blown films, comprising
   i) blowing up a tube of a molten C$_2$C$_3$ random copolymer composition according to claim 1 with air perpendicularly to the upwards direction from a side-fed blown film die;
   ii) cooling the composition down with a water contact cooling ring or air quench; and
   iii) folding and guiding the composition over deflector rolls onto a winder.

7. A sterilizable or sterilized article, comprising a C$_2$C$_3$ random copolymer composition according to claim 1.

8. A sterilizable or sterilized film comprising a C$_2$C$_3$ random copolymer composition according to claim 1.

9. The sterilizable or sterilized film according to claim 8, whereby the films are characterized by
   (i) a seal initiation temperature (SIT) of below 110° C.,
   (ii) satisfying the equation T$_m$-SIT≥25, wherein Tm is the melting point of the C$_2$C$_3$ random copolymer composition,
   (iii) a haze (determined according to ASTM D1003-00 on cast films with a thickness of 50 μm) of at most 2.5%,
   (iv) a transparency (determined according to ASTM D1003-00 on cast films with a thickness of 50 μm) of at least 90.0%,
   (v) a relative tear resistance in machine direction [N/mm] according to Elmendorf method (ISO 6383-2) for a cast film thickness of 50 μm of at least 28.0 N/mm and
   (vi) a relative tear resistance in transverse direction [N/mm] according to Elmendorf method (ISO 6383-2) for a cast film thickness of 50 μm of at least 200.0 N/mm.

10. A film according to claim 9 prepared by cast film technology.

11. The film according to claim 8 having a haze value (determined according to ASTM D1003-00 on cast films with a thickness of 50 μm) after steam sterilization at 121° C. for 30 min of at most 25% and a transparency (determined according to ASTM D1003-00 on cast films with a thickness of 50 μm) after steam sterilization at 121° C. for 30 min of at least 90.0%.

12. The film according to claim 9 having a haze value (determined according to ASTM D1003-00 on cast films with a thickness of 50 μm) after steam sterilization at 121° C. for 30 min of at most 25% and a transparency (determined according to ASTM D1003-00 on cast films with a thickness of 50 μm) after steam sterilization at 121° C. for 30 min of at least 90.0%.

13. The process according to claim 4, comprising
    a) polymerizing in a first reactor (R-1) being a loop reactor (LR), propylene and ethylene, obtaining a C$_2$C$_3$ random copolymer (A).

14. The process according to claim 4, wherein R$^{6'}$ is a tertiary alkyl group.

15. The process according to claim 5, wherein
    each X is independently a hydrogen atom, a halogen atom, C$_{1-6}$ alkoxy group, C$_{1-6}$ alkyl, phenyl or benzyl group.

16. The process according to claim 15, wherein
    R$^{6'}$ is a tertiary alkyl group.

17. The process according to claim 16, wherein
    n is independently 0, 1 or 2.

* * * * *